United States Patent
Welstead, Jr.

[11] 3,862,982
[45] Jan. 28, 1975

[54] 2-(OMEGO-SUBSTITUTED ALKOXY) BENZOPHENONES
[75] Inventor: William John Welstead, Jr., Richmond, Va.
[73] Assignee: A. H. Robins Company, Incorporated, Richmond, Va.
[22] Filed: June 16, 1972
[21] Appl. No.: 263,481

[52] U.S. Cl....... 260/482 C, 260/307 C, 260/340.2, 260/591, 424/278, 424/300, 424/331
[51] Int. Cl........................................... C07c 125/06
[58] Field of Search........................ 260/482 C, 591

[56] References Cited
OTHER PUBLICATIONS
Noller, C. R., Chem. of Organic Cmpds., 2nd Ed., 1960, pp. 161.

Primary Examiner—Lorraine A. Weinberger
Assistant Examiner—Paul J. Killos

[57] ABSTRACT

Novel 2-(omega-substituted alkoxy)benzophenones are described having the formula:

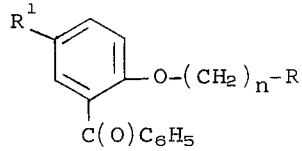

wherein R is carbamoyloxy, N-loweralkylcarbamoyloxy, N,N-di-loweralkylcarbamoyloxy, 1,2-dihydroxyethyl, 2-carbamoyloxy-1-hydroxyethyl, 2-dioxolanon-4-yl, 2-oxazolinidinon-5-yl, 3-methyl-2-oxazolidinon-5-yl and 1-hydroxy-2-(o-methoxyphenoxy)ethyl; $R^1$ is halogen, hydrogen, alkoxy, nitro and trifluoromethyl; and n is one and two. The compounds have mild CNS depressant activity as determined in mice and some of the compounds are inhibitors of pepsin proteolysis.

6 Claims, No Drawings

2-(OMEGO-SUBSTITUTED ALKOXY) BENZOPHENONES

The present invention relates to novel benzophenones and is particularly concerned with 2-(omega-substituted)benzophenones, compositions thereof and methods of making and using same.

The invention is especially concerned with novel compounds having the formula:

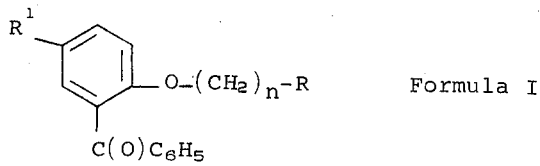

Formula I wherein R is carbamoyloxy, N-lower-alkylcarbamoyloxy, N,N-dilower-alkylcarbamoyloxy, 1,2-dihydroxyethyl, 2-carbamoyloxy-1-hydroxyethyl, 2-dioxolanon-4-yl, 2-oxazolidinon-5-yl, 3-methyl-2-oxazolidinon-5-yl and 1-hydroxy-2-(o-methoxyphenoxy)ethyl; $R^1$ is halogen, hydrogen, lower-alkoxy, nitro and trifluoromethyl; and n is one and two.

The novel compounds of the present invention exhibit mild pharmacological CNS depressant activity as determined by the neuropharmacological profile in mice using the method of S. Irwin (Nodine, H. and Siegler, P. E. (eds.): Animal and Clinical Pharmacologic Techniques in Drug Evaluation, Vol. 1, pp 36–54). Some of the compounds also inhibit pepsin proteolysis as determined by the Mett method (Hawk, B. P., Oser, B. L., and Summerson, W. H.: Practical Physiological Chemistry, McGraw-Hill, New York, 1951, p. 374).

The term "lower-alkyl" in the foregoing Formula I and where it appears elsewhere throughout the specification and claims thereof, includes straight and branched chain radicals of up to eight carbon atoms inclusive as exemplified by such groups as methyl, ethyl, propyl, butyl and the like. "Lower-alkoxy" has the formula O-lower-alkyl.

METHOD OF PREPARATION

The preparation of 2-(ω-substituted alkoxy)-5-substituted benzophenones (I) may be accomplished by mixing and reacting the appropriately substituted benzophenone (II) with a reactant B (III) wherein B can be an isocyanate, a dialkylaminocarbonyl chloride, ammonium hydroxide or a reactant having a reactive halide radical. The reaction sequence is illustrated by the following:

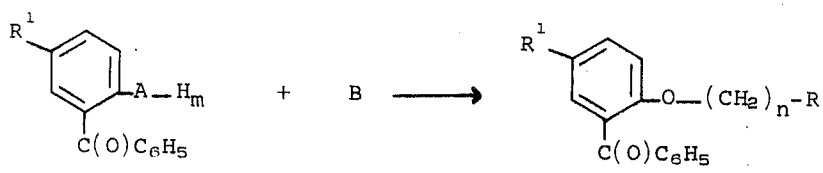

wherein R, $R^1$ and n are as defined hereinabove, A is selected from the group consisting of $-OCH_2CH_2O-$, $-O-$, $-OCH_2CHOHCH_2O-$ and

and m is zero or one.

The method of preparation of one of the starting materials, namely, 5-chloro-2-(2-hydroxyethoxy)benzophenone, is a modification of the method described in the literature and the modified procedure is given in Preparation I.

PREPARATION I

5-Chloro-2-(2-hydroxyethoxy)benzophenone.

A mixture of 60 g. (0.258 mole) of 5-chloro-2-hydroxybenzophenone, 48 g. (0.52 mole) of 2-bromoethanol, 14 g. (0.26 mole) of sodium methoxide and 300 ml. of abs. alcohol was stirred at reflux temperature for 20 hours. Thin layer chromatography indicated only about 40 percent product formation. The mixture was poured into water, acidified with 3N hydrochloric acid and extracted into benzene. After drying over magnesium sulfate the benzene extracts were evaporated to an oil which was taken up into dimethylformamide (200 ml.). To the dimethylformamide solution was added 75 g. (0.5 mole) of potassium carbonate and 48 g. (0.5 mole) of 2-bromoethanol and the mixture was heated at 75°C. for six hours. After cooling, the mixture was filtered and the filtrate was evaporated to an oil. Distillation of the oil, 168°–175°C./0.2 mm., gave 55.5 g. (78 percent) of product.

| Analysis: | Calculated for $C_{15}H_{13}ClO_3$: | C, 65.10; H, 4.74 |
|---|---|---|
| | Found: | C, 64.84; H, 4.72 |

PREPARATION II

When in the procedure of Preparation I, 5-chloro-2-hydroxybenzophenone is replaced by an equal molar amount of:
2-hydroxybenzophenone,
5-methoxy-2-hydroxybenzophenone,
5-nitro-2-hydroxybenzophenone, and
5-trifluoromethyl-2-hydroxybenzophenone,
there are obtained:
2-(2-hydroxyethoxy)benzophenone,
5-methoxy-2-(2-hydroxyethoxy)benzophenone,
5-nitro-2-(2-hydroxyethoxy)benzophenone, and
5-trifluoromethyl-2-(2-hydroxyethoxy)benzophenone.

The following examples are presented to illustrate the preparation of compounds of the present invention and they should not be construed as limiting it in spirit or in scope.

EXAMPLE 1

2-(2-Carbamoyloxyethoxy)-5-chlorobenzophenone.

To a slowly stirred mixture of 10 g. (0.036 mole) of 5-chloro-2-(2-hydroxyethoxy)benzophenone and 4.7 g. (0.073 mole) of sodium cyanate in 50 ml. of methylene chloride was added, dropwise, 8.8 g. (0.073 mole) of trifluoroacetic acid. After stirring for four hours the mixture was poured into water, the methylene chloride layer was separated, dried over magnesium sulfate and evaporated to a solid. Recrystallization from methanol gave 7.3 g. (65 percent) of pure product which melted at 151°–155°C.

Analysis:
Calculated for C₁₆H₁₄ClNO₄: C,60.10; H,4.41; N,4.38
Found : C,59.87; H,4.45; N,4.36

EXAMPLE 2

When in the procedure of Example 1, 5-chloro-2-(2-hydroxyethoxy)benzophenone is replaced by an equal molar amount of:

2-(2-hydroxyethoxy)benzophenone,
5-methoxy-2-(2-hydroxyethoxy)benzophenone,
5-nitro-2-(2-hydroxyethoxy)benzophenone, and
5-trifluoromethyl-2-(2-hydroxyethoxy)benzophenone, there are obtained:

2-(2-carbamoyloxyethoxy)benzophenone,
5-methoxy-2-(2-carbamoyloxyethoxy)benzophenone,
5-nitro-2-(2-carbamoyloxyethoxy)benzophenone, and
5-trifluoromethyl-2-(2-carbamoyloxyethoxy)benzophenone.

EXAMPLE 3

5-Chloro-2-[2-(N-methylcarbamoyloxy)ethoxy]benzophenone.

A solution of 12 g. (0.043 mole) of 5-chloro-2-(2-hydroxyethoxy)benzophenone in 50 ml. of benzene containing 10 ml. of pyridine was treated with 10 g. (0.18 mole) of methylisocyanate and stirred overnight. The mixture was washed successively with water, 3N hydrochloric acid and 3N sodium hydroxide. The benzene solution was dried over magnesium sulfate and evaporated to a solid which was recrystallized from isopropyl ether. The yield of product was 11.2 g. (78 percent); melting point 83°–90°C.

Analysis:
Calculated for C₁₇H₁₆ClNO₄: C,61.17; H,4.83; N,4.20
Found : C,60.74; H,4.87; N,4.22

EXAMPLE 4

2-[2-(N-Butylcarbamoyloxy)ethoxy]-5-chlorobenzophenone.

A solution of 10 g. (0.036 mole) of 5-chloro-2-(2-hydroxyethoxy)benzophenone in 50 ml. of benzene was treated with 3.6 g. (0.036 mole) of butylisocyanate and refluxed overnight. The reaction mixture was evaporated to an oil. The oil was dissolved in benzene and chromatographed on 250 g. of 60–100 mesh magnesium silicate eluting with benzene-acetone mixture. The eluate was concentrated and the residual solid was recrystallized from an isopropyl ether-petroleum ether mixture. The yield was 6.5 g. (48 percent); m.p. 74°–76°C.

Analysis:
Calculated for C₂₀H₂₂ClNO₄: C,63.91; N,5.90; N,3.73
Found: C,64.03; H,5.91; N,3.75

EXAMPLE 5

5-Chloro-2-[2-(N,N-dimethylcarbamoyloxy)ethoxy]benzophenone.

To a stirred mixture of (0.029 mole) of sodium hydride in 50 ml. of dry benzene was added 8 g. (0.029 mole) of 5-chloro-2-(2-hydroxyethoxy)benzophenone. After the evolution of hydrogen had ceased, 3.1 g. (0.029 mole) of dimethylcarbamoyl chloride was added and the mixture was stirred for one hour. The mixture was poured into water and the benzene layer was separated, dried over magnesium sulfate and evaporated to an oil. The oil was crystallized from isopropyl ether, yielding 4.5 g. (45 percent) of product which melted at 69°–71°C.

Analysis:
Calculated for C₁₈H₁₈ClNO₄: C,62.16; H,5.22; N,4.03
Found : C,62.21; H,5.28; N,4.08

EXAMPLE 6

When in the procedure of Example 5, 5-chloro-2-(2-hydroxyethoxy)benzophenone is replaced by an equal molar amount of:

5-methoxy-2-(2-hydroxyethoxy)benzophenone, and
2-(2-hydroxyethoxy)benzophenone, there are obtained:

5-methoxy-2-[2-(N,N-dimethylcarbamoyloxy)ethoxy]benzophenone, and
2-[2-(N,N-dimethylcarbamoyloxy)ethoxy]benzophenone.

EXAMPLE 7

5-Chloro-2-(2,3-dihydroxypropoxy)benzophenone.

A stirred mixture of 14.4 g. (0.6 mole) of sodium hydride in 300 ml. of dimethylformamide at 0°C., under a nitrogen atmosphere, was treated dropwise with 116 g. (0.5 mole) of 5-chloro-2-hydroxybenzophenone. The mixture was warmed to room temperature until evolution of hydrogen ceased, then 56 g. (0.5 mole) of 3-chloro-1,2-propandiol in 200 ml. of dimethylformamide was added. The mixture was heated at 110°C. for 36 hours, then concentrated. The residual oil was dissolved in benzene and the benzene solution was washed with 50 percent sodium hydroxide followed by washing with water. The benzene solution was dried over magnesium sulfate and evaporated to yield 150 g. of crude product. A 12 g. sample was chromatographed on a column of 300 g. of magnesium silicate and eluted with benzeneacetone. The oil from the concentrated eluate weighed 7.5 g. (61 percent). A sample was molecularly distilled for analysis.

Analysis: Calculated for C₁₆H₁₅ClO₄: C,62.70; H,4.92
Found : C,62.43; H,5.04

EXAMPLE 8

When in the procedure of Example 7, 5-chloro-2-hydroxybenzophenone is replaced by an equal molar amount of:

5-methoxy-2-hydroxybenzophenone, and
2-hydroxybenzophenone,
there are obtained:
5-methoxy-2-(2,3-dihydroxypropoxy)benzophenone, and
2-(2,3-dihydroxypropoxy)benzophenone.

EXAMPLE 9

5-Chloro-2-(2-dioxolanon-4-ylmethoxy)benzophenone.

To a cooled chloroform solution containing 60 g. (0.156 mole) of 5-chloro-2-(2,3-dihydroxypropoxy)benzophenone, a solution of 15.4 g. (0.156 mole) of phosgene in chloroform was added dropwise. After addition, the mixture was allowed to come to room temperature and stirred for three additional hours. The reaction mixture was poured into water and the chloroform layer was separated, dried over magnesium sulfate and evaporated under reduced pressure to an oil which solidified on standing. Recrystallization of the crude product from methanol gave 25.5 g. (49 percent) of pure product which melted at 122°–124°C.

Analysis:   Calculated for $C_{17}H_{13}ClO_5$:   C,61.36; H,3.94
            Found :                              C,61.49; H,4.06

EXAMPLE 10

When in the procedure of Example 9, 5-chloro-2-(2,3-dihydroxypropoxy)benzophenone is replaced by an equal molar amount of:
2-(2,3-dihydroxypropoxy)benzophenone,
5-methoxy-2-(2,3-dihydroxypropoxy)benzophenone,
5-nitro-2-(2,3-dihydroxypropoxy)benzophenone, and
5-trifluoromethyl-2-(2,3-dihydroxypropoxy)benzophenone,
there are obtained:
2-(2-dioxolanon-4-ylmethoxy)benzophenone,
5-methoxy-2-(2-dioxolanon-4-ylmethoxy)benzophenone,
5-nitro-2-(2-dioxolanon-4-ylmethoxy)benzophenone, and
5-trifluoromethyl-2-(2-dioxolanon-4-ylmethoxy)benzophenone.

EXAMPLE 11

5-Chloro-2-(3-carbamoyloxy-2-hydroxypropoxy)benzophenone.

A stirred mixture of 9.0 g. (0.027 mole) of 5-chloro-2-(2-dioxolanon-4-ylmethoxy)benzophenone in 20 ml. of benzene and 50 ml. of concentrated ammonium hydroxide was stirred for 48 hours. The solid product which weighed 7 g. (74 percent) was separated by filtration and after crystallization from benzene-isooctane melted at 117°–119°C.

Analysis:
Calculated for $C_{17}H_{16}ClNO_5$:   C,58.37; H,4.61; N,4.01
Found :                                C,58.47; H,4.69; N,3.90

EXAMPLE 12

5-Chloro-2-[2-hydroxy-3-(o-methoxyphenoxy)-propoxy]benzophenone.

A stirred mixture of 11.6 g. (0.05 mole) of 5-chloro-2-hydroxybenzophenone, 11 g. (0.05 mole) of 1-chloro-3-(o-methoxyphenoxy)-2-propanol and 13 g. of potassium hydroxide in 50 ml. of dimethylformamide was heated at 100°C. for 24 hours and then poured into water. The product was extracted into benzene which was dried over magnesium sulfate and evaporated to an oil. The oil was chromatographed on 350 g. of magnesium silicate, eluting with a benzene-acetone mixture. The pure product solidified when the eluate was treated with isooctane. The yield was 8 g. (40 percent). After recrystallization from isooctane the product melted at 86°–88°C.

Analysis:   Calculated for $C_{23}H_{21}ClO_5$:   C,66.91; H,5.13
            Found:                                C,66.26; H,5.11

EXAMPLE 13

5-Chloro-2-(2-oxazolidinon-5-ylmethoxy)benzophenone.

A stirred mixture of 10 g. (0.043 mole) of 5-chloro-2-hydroxybenzophenone, 7.7 g. (0.043 mole) of 5-bromomethyl-2-oxazolidinone, 6 g. of potassium carbonate and 60 ml. of dimethylformamide was heated at 120°C. for 36 hours and then poured into water. The product was extracted into benzene and the benzene extract was dried over magnesium sulfate and evaporated to an oil. The oil was chromatographed on a column containing 350 g. of magnesium silicate, eluting with benzeneacetone mixture to give 5.5 g. of purified oil which solidified. Crystallization of the solid from benzene-ether gave 3.5 g. (35 percent) of pure product melting at 115°–117°C.

Analysis:
Calculated for $C_{17}H_{14}ClNO_4$:   C,61.54; H,4.25; N,4.22
Found :                                C,61.40; H,4.49; N,4.37

EXAMPLE 14

5-Chloro-2-[2-(3-methyl-2-oxazolidinon-5-yl)ethoxy]benzophenone.

A stirred mixture of 8.6 g. (0.037 mole) of 5-chloro-2-hydroxybenzophenone, 6g. (0.037 mole) of 3-methyl-5-(2-chloroethyl)-2-oxazolidinone and 5.1 g. (0.037 mole) of potassium carbonate in 30 ml. of dimethylformamide was heated at 85°C. for 24 hours. The mixture was poured into water, extracted with benzene and the benzene extract dried over magnesium sulfate. Chromatography of the benzene solution of 350 g. of magnesium silicate and eluting with benzene-acetone, gave 11 g. (83 percent) of oily product. A sample was molecularly distilled for analysis. On standing, the oil solidified which after recrystallization from benzene-isooctane melted at 94°–96°C.

Analysis:
Calculated for $C_{19}H_{18}ClNO_4$:   C,63.42; H,5.04; N,3.89
Found:                                 C,63.58; H,5.09; N,4.15

What is claimed is:
1. A compound selected from 2-(omega-substituted alkoxy) benzophenones having the formula:

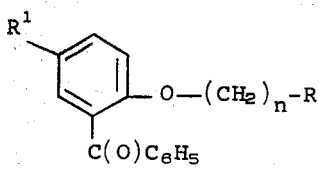

wherein;

R is selected from carbamoyloxy, N-loweralkylcarbamoyloxy, N,N-diloweralkylcarbamoyloxy and 2-carbamoyloxy-1-hydroxyethyl, $R^1$ is selected from halogen, hydrogen, alkoxy, nitro and trifluoromethyl, and n is selected from one and two.

2. A compound of claim 1 which is 2-(2-carbamoyloxyethoxy-5-chlorobenzophenone.

3. A compound of claim 1 which is 5-chloro-2-[2-(N-methylcarbamoyloxy)ethoxy]benzophenone.

4. A compound of claim 1 which is 2-[2-(N-butylcarbamoyloxy)ethoxy]-5-chlorobenzophenone.

5. A compound of claim 1 which is 5-chloro-2-[2-(N,N-dimethylcarbamoyloxy)-ethoxy]benzophenone.

6. A compound of claim 1 which is 2-[(3-carbamoyloxy-2-hydroxypropoxy]-5-chlorobenzophenone.

* * * * *